(12) United States Patent
Yang et al.

(10) Patent No.: US 12,019,809 B2
(45) Date of Patent: *Jun. 25, 2024

(54) METHOD FOR IDENTIFYING SIZE OF OBJECT, OPTICAL SENSING APPARATUS AND SYSTEM

(71) Applicant: PIXART IMAGING INC., Hsin-Chu (TW)

(72) Inventors: Tien-Chung Yang, Hsin-Chu (TW); Chia-Kai Chen, Hsin-Chu (TW); En-Feng Hsu, Hsin-Chu (TW); Chen-Lung Liu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,587

(22) Filed: Apr. 10, 2023

(65) Prior Publication Data

US 2023/0244319 A1 Aug. 3, 2023

Related U.S. Application Data

(63) Continuation of application No. 17/334,428, filed on May 28, 2021, now Pat. No. 11,662,828.

(51) Int. Cl.
*G06F 3/01* (2006.01)
*G01S 17/42* (2006.01)
(Continued)

(52) U.S. Cl.
CPC .............. *G06F 3/017* (2013.01); *G01S 17/42* (2013.01); *G01S 17/50* (2013.01); *G01S 17/88* (2013.01)

(58) Field of Classification Search
CPC ......... B66B 1/461; G01S 17/04; G01S 17/42; G01S 17/50; G01S 17/88; G01S 17/58; G06F 3/017; G06F 3/0421; G06F 3/0304; G06F 3/0312; G06T 7/74; H03K 17/941; G01B 11/026

See application file for complete search history.

(56) References Cited

U.S. PATENT DOCUMENTS

2006/0238492 A1* 10/2006 Fouquet ................ G06F 3/0312
345/156
2007/0242034 A1* 10/2007 Haven ................... G06F 3/0304
345/156

(Continued)

*Primary Examiner* — Richard J Hong
(74) *Attorney, Agent, or Firm* — Li & Cai Intellectual Property (USA) Office

(57) ABSTRACT

A method for identifying an object, an optical sensing apparatus and a system are provided. A controller of the system drives multiple light sources of the optical sensing apparatus to emit the multiple light beams with different beam angles, controls a light sensor to sense the lights reflected by the object, and performs the method for identifying the object. In the method, the light sensor is used to sense a first light emitted by a first light source with a first beam angle reflected by the object, and sense an intensity of the reflected first light. The light sensor is also used to sense a second light emitted by a second light source with a second beam angle reflected by the object and sense another intensity of the reflected second light. Therefore, the object can be identified by integrating information of the intensities obtained by the light sensor.

13 Claims, 12 Drawing Sheets

(51) Int. Cl.
*G01S 17/50* (2006.01)
*G01S 17/88* (2006.01)

(56) References Cited

U.S. PATENT DOCUMENTS

| | | | | |
|---|---|---|---|---|
| 2008/0186475 | A1* | 8/2008 | Kawata | G01S 17/58 356/73 |
| 2012/0232836 | A1* | 9/2012 | Ohmi | G06F 3/0304 702/150 |
| 2013/0131473 | A1* | 5/2013 | Gu | G06F 3/0421 600/324 |
| 2015/0193934 | A1* | 7/2015 | Fuchikami | G06T 7/74 348/142 |
| 2015/0226553 | A1* | 8/2015 | Fuchikami | G01B 11/026 348/135 |
| 2015/0316991 | A1* | 11/2015 | Jung | G06F 3/017 356/614 |
| 2017/0117891 | A1* | 4/2017 | Lohbihler | H03K 17/941 |

* cited by examiner

METHOD FOR IDENTIFYING SIZE OF OBJECT, OPTICAL SENSING APPARATUS AND SYSTEM

CROSS-REFERENCE TO RELATED PATENT APPLICATION

This is a continuation application of U.S. application Ser. No. 17/334,428, filed on May 28, 2021 and entitled "METHOD FOR IDENTIFYING OBJECT, OPTICAL SENSING APPARATUS AND SYSTEM, where all of the aforementioned patent applications and patents are incorporated herein by reference.

FIELD OF THE DISCLOSURE

The present disclosure relates to a technology of identifying an approaching object, and more particularly to a method for identifying object, an optical sensing apparatus and a system.

BACKGROUND OF THE DISCLOSURE

Rather than a conventional button that a user's hand should press thereon in order to perform a subsequent action, e.g., switching a light on or off, a new type of contactless button allows a user to perform the subsequent action without touching the button. Further, the contactless button is advantageous to prevent the user from being exposed to the risk of virus infection due to hygienic concerns.

An optical proximity sensor is generally one of the solutions to implement the contactless button. The proximity sensor is able to detect an approaching object by using a light source to emit a light and sensing the intensity of the light reflected by the object. However, one major challenge of the conventional optical proximity sensor is that it may easily lead to a misjudgment since it only relies on the intensity of the light, which is emitted by only one light source, reflected by the object to determine the approaching object. It is easy to make the misjudgment due to the various intensities may be obtained while sensed from the light reflected by various unknown object with different reflectivities are not reliable.

For instance, a switch equipped with the conventional optical proximity sensor may be turned on or off regardless of the sensed object approaching the switch is a user's finger that is supposed to be sensed or his body. In other words, the conventional optical sensor cannot identify the size of the approaching object effectively.

FIG. 1 shows an example of a conventional switch 12 equipped with the conventional optical proximity sensor. In general, the optical proximity sensor is configured to provide a sensing angle θ and sense any object entering a sensing zone defined by the sensing angle θ. In the present example, when a user's hand 10 approaches the switch 12 for switching on or off a light bulb 14, the switch 12 can be activated if the optical proximity sensor inside the switch 12 senses the user's hand 10. However, the switch 12 may lead to a false action if an approaching object is sensed by the optical proximity sensor even if it is not intent to press the switch 12 to turn on the light bulb 14. For example, the light bulb 14 may be turned on or off unintentionally only because the approaching object is big enough to be sensed by the optical proximity sensor.

SUMMARY OF THE DISCLOSURE

In response to the above-referenced technical inadequacies, the present disclosure provides a method for identifying an object, an optical sensing apparatus and a system thereof. The system includes one or more optical sensing apparatuses and a controller. The optical sensing apparatus includes multiple light sources that are used to emit multiple light beams with different beam angles and a light sensor used to sense intensities of the light beams reflected by an object when the multiple light beams illuminate the object. The controller drives the multiple light sources to emit the multiple light beams, controls the light sensor to sense the light beams reflected by the object, and performs the method for identifying the object.

In one embodiment of the present disclosure, in the method, a first light source is used to emit a first light beam with a first beam angle, and a light sensor is used to sense a first intensity of the first light beam reflected by the object; a second light source is used to emit a second light beam with a second beam angle, and the light sensor is used to sense a second intensity of the second light beam reflected by the object. The object can accordingly be identified by integrating information of the intensities obtained by the light sensor.

In an aspect, the first beam angle of the first light beam is different from the second beam angle of the second light beam, and intensities respectively sensed from the reflected first light beam and the reflected second light beam form the information to identify a size of the object. Further, the intensities respectively sensed from different reflected light beams can be compared with each other for determining a movement of the object.

In another aspect, the first beam angle of the first light beam is configured to be smaller than the second beam angle of the second light beam, and the object can be identified when the object enters both the first beam angle and the second beam angle. When the intensity sensed from the reflected first light beam is greater than the intensity sensed from the reflected second light beam and a difference between the intensities exceeds a threshold, it is determined that the object is close to the light sensor.

In yet another aspect, in the method, a first set of intensities can be sensed for a period of time and a second set of intensities can also be sensed for the same period of time. The first set and the second set of intensities being sensed over time are resolved to determine a movement of the object. When a first trend of changes of the first set of intensities is close to a second trend of changes of the second set of intensities for the period of time, it is determined that the object is close to or away from the light sensor.

Furthermore, in one further embodiment of the present disclosure, the optical sensing apparatus implements a contactless switch adapted to an electronic device. The contactless switch is configured to accept a gesture performed by a user's finger or palm, and the size of the object indicates the user's finger or palm. 16. Further, the contactless switch is configured to accept a gesture performed by a user's finger or palm, and the size of the object determined by the method of the present disclosure can be interpreted as the user's finger or palm.

According to one further embodiment of the present disclosure, the system includes a water meter that has a rotatable pointer and a rotatable half plate. The system includes a first proximity sensor disposed in or on the water meter. The first proximity sensor outputs a first signal when the first proximity sensor detects the rotatable half plate. The first proximity sensor outputs a second signal when the first proximity sensor does not detect the rotatable half plate. The system includes a second proximity sensor disposed in or on the water meter. The second proximity sensor outputs a third signal when the second proximity sensor detects the rotatable half plate and the second proximity sensor outputs a fourth signal when the second proximity sensor does not detect the rotatable half plate. A controller of the system receives the signals from the first proximity sensor and the second proximity sensor and determines that the water meter is rotated clockwise or counter-clockwise.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
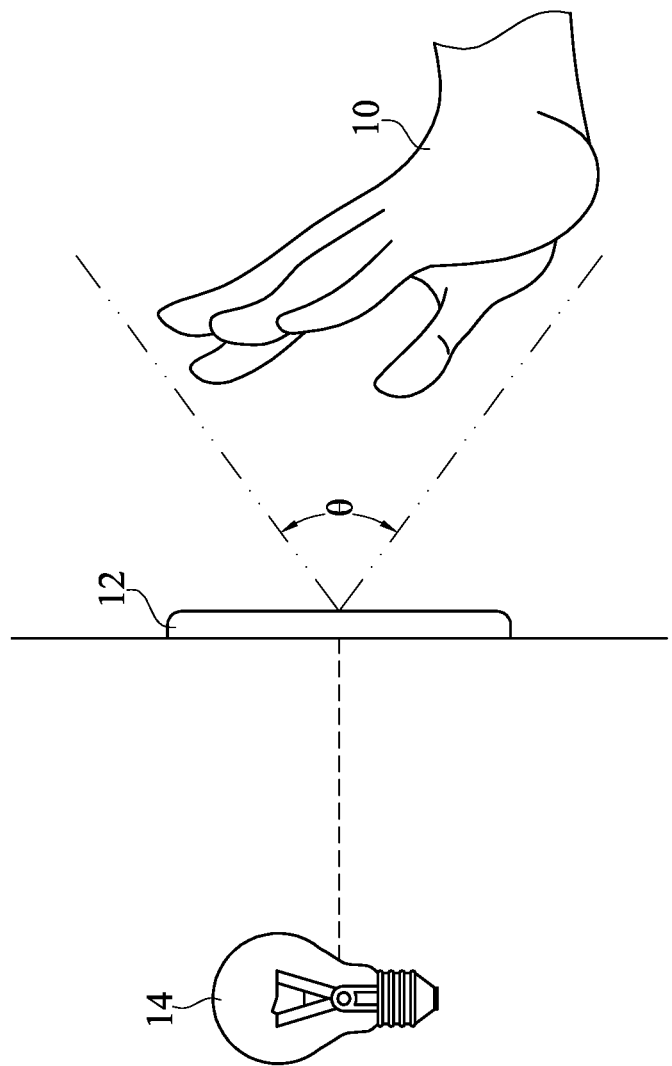
FIG. 1 shows an example of a conventional switch adopting a proximity sensor.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is about a method for identifying an object with an optical sensing apparatus that generally includes multiple light sources used to emit multiple light beams with different beam angles, and a light sensor used to sense the lights reflected by an object when the multiple light beams illuminate the object. A system including one or more optical sensing apparatuses and a controller is also provided. The controller is electrically connected to the one or more optical sensing apparatuses. The controller drives the multiple light sources to emit the multiple light beams, controls the light sensor to sense the lights reflected by the object, and performs the method for identifying the object.

One of the objectives of the system and the method of the present disclosure is to reduce misjudgments when identifying the object entering coverage of the one or more optical sensing apparatuses of the system. The object can be accurately identified because the system acquires further more spatial information sensed by the light sensor from the multiple light sources that are configured to emit the multiple light beams with different beam angles.

Figure 2:
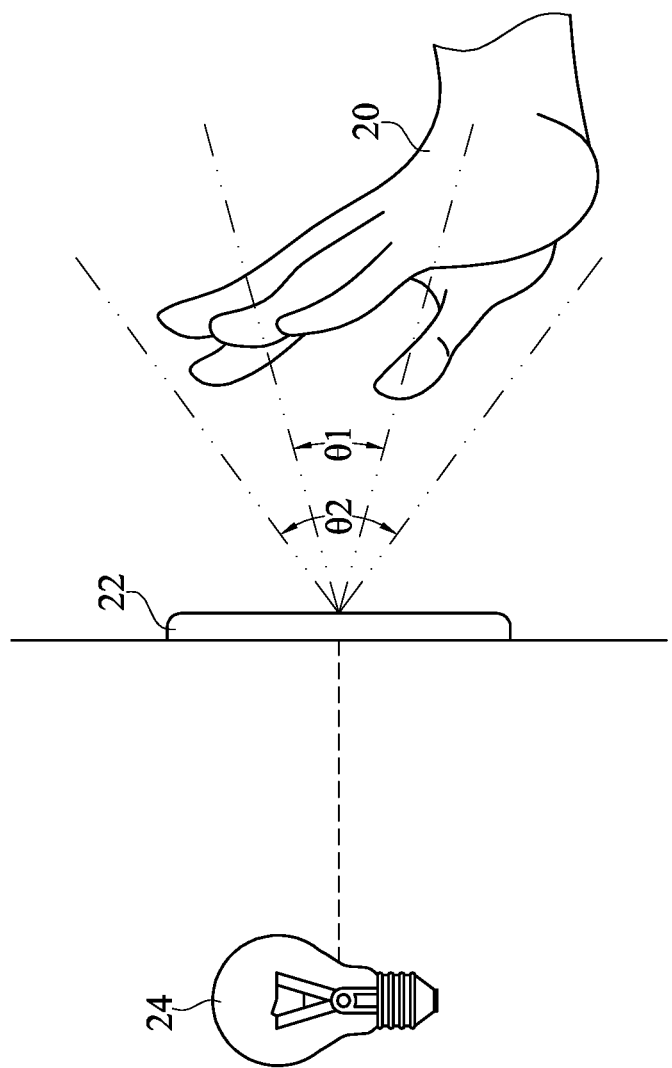
FIG. 2 is a schematic diagram depicting a switch adopting an optical sensing apparatus including multiple light sources for sensing an approaching object according to one embodiment of the present disclosure.

FIG. 2 is a schematic diagram depicting a switch 22 adopting the optical sensing apparatus equipped with multiple light sources for sensing an approaching object according to one embodiment of the present disclosure. In an aspect of the disclosure, the optical sensing apparatus having the multiple light sources is provided to be installed in a switch 22 electrically connected to a controlled device 24 and accordingly the switch 22 is configured to sense an approaching object, e.g., a hand 20, for determining whether or not to turn on or off the controlled device 24 when the object enters a sensing zone defined by a first beam angle $\theta_1$ and a second beam angle $\theta_2$.

According to one embodiment of the present disclosure, the optical sensing apparatus installed in the switch 22 emits at least two light beams with two different beam angles, i.e., the first beam angle $\theta_1$ and the second beam angle $\theta_2$ schematically shown in the drawing, from at least two light sources. Accordingly, system including one or more optical sensing apparatuses can effectively acquire more spatial information from the two or more different beam angles that define a specific sensing zone. The optical sensing apparatus uses a light sensor to sense an intensity of a light beam reflected by an object within the first beam angle $\theta_1$, and another intensity of another light beams reflected by the object within the second beam angle $\theta_2$. The system further includes a controller that is electrically connected with the multiple light sources and the light sensor and is able to integrate the information of the different intensities for identifying any approaching object entering the sensing zone. Afterwards, the controller can switch on or off the controlled device 24 based on the information. It should be noted that the information of the different intensities indicates a ratio of or a different between the two or more intensities sensed by the light sensor from the at least two light beams.

Further, it should be noted that, in one further aspect of the present disclosure, the different light beams can also be emitted by a single light source when the light source emits the different light beams with different beam angles via different optical arrangements by a time-sharing method.

Figure 3:
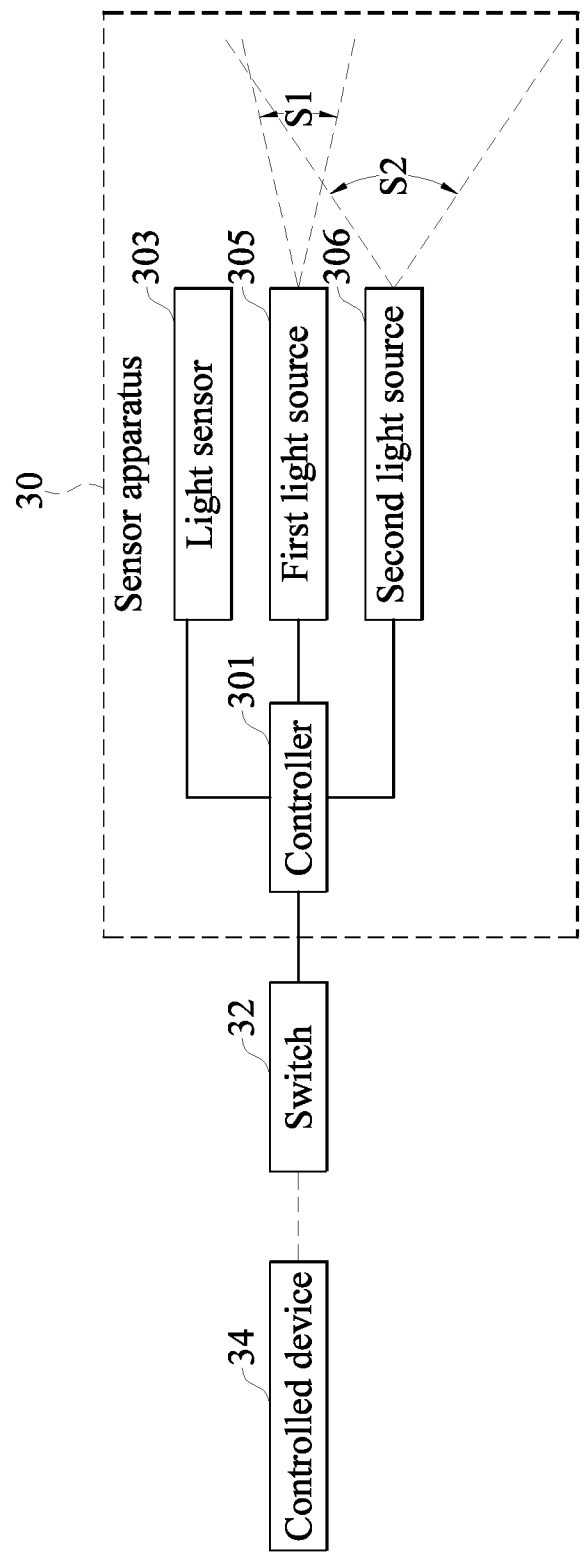
FIG. 3 is a functional block diagram of an optical sensing apparatus according to one embodiment of the present disclosure.

Next, reference is made to FIG. 3, which is a functional block diagram of an optical sensing apparatus according to one embodiment of the present disclosure.

In the present embodiment of the disclosure, an optical sensing apparatus 30 shown in the drawing includes a first light source 305, a second light source 306 and a light sensor 303. In particular, a first sensing range S1 is defined by a first light beam with a beam angle that is emitted by the first light source 305 and reached to the light sensor 303, and a second sensing range S2 is defined by a second light beam with a different beam angle that is emitted by the second light source 306 and also reached to the light sensor 303. The first sensing range S1 is configured to be different from the second sensing range S2. The light sensor 303 is configured to sense the lights reflected by an object when the multiple light beams illuminate the object. The optical sensing apparatus 30 includes a controller 301 that is electrically connected to the multiple light sources (e.g., the first light source 305 and the second light source 306) and the light sensor 303. In an aspect of the disclosure, the controller 301 drives the multiple light sources (305, 306) to emit the multiple light beams, controls the light sensor 303 to sense the lights reflected by the object, and performs a method for identifying the object.

In the present embodiment, the optical sensing apparatus 30 is installed in a switch 32 that is adapted to an electronic device, i.e., a controlled device 34. The controller 301 constantly detect if any object approaches the switch 32 and identify the object by integrating information of the first intensity sensed from the first light beam within the first sensing range S1 and the second intensity sensed from the second light beam within the second sensing range S2.

Accordingly, the information obtained from the first intensity and the second intensity is referred to for determining whether or not the switch 32 is activated to control the controlled device 34. In an exemplary example, when the first intensity sensed from the reflected first light beam is greater than the second intensity sensed from the reflected second light, and as well a difference between the first intensity and the second intensity exceeds a threshold, it is determined that the object is close to the switch 32, and the switch 32 is activated to switch on or off the controlled device 34.

Figure 4:
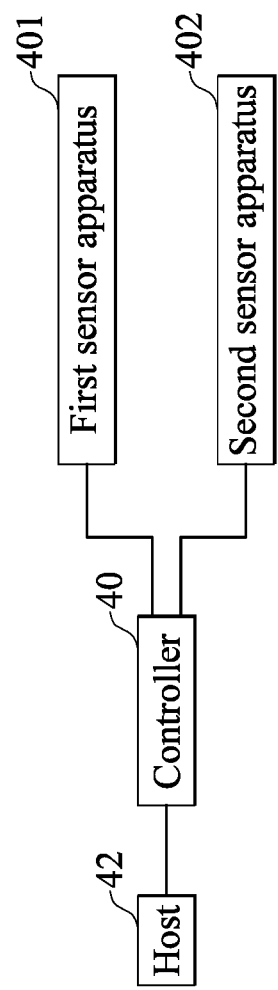
FIG. 4 is another functional block diagram of a system for identifying an object with one or more optical sensing apparatuses according to another embodiment of the present disclosure.

FIG. 4 is another functional block diagram of the system for identifying an object with one or more optical sensing apparatuses according to another embodiment of the present disclosure.

Figure 6A:
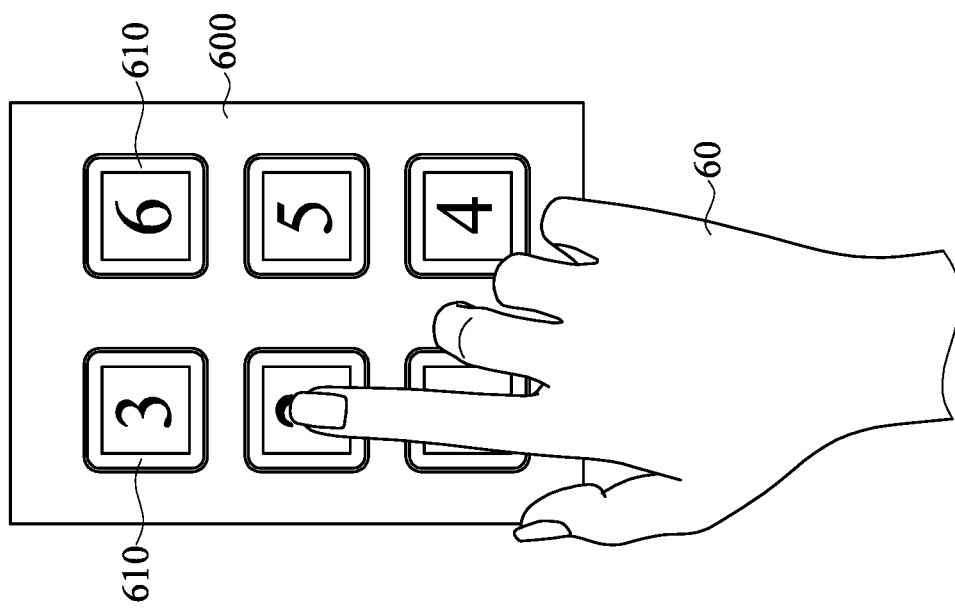
FIGS. 6A-6C show schematic diagrams depicting an application of the system with multiple optical sensing apparatuses according to one embodiment of the present disclosure.
Figure 6B:
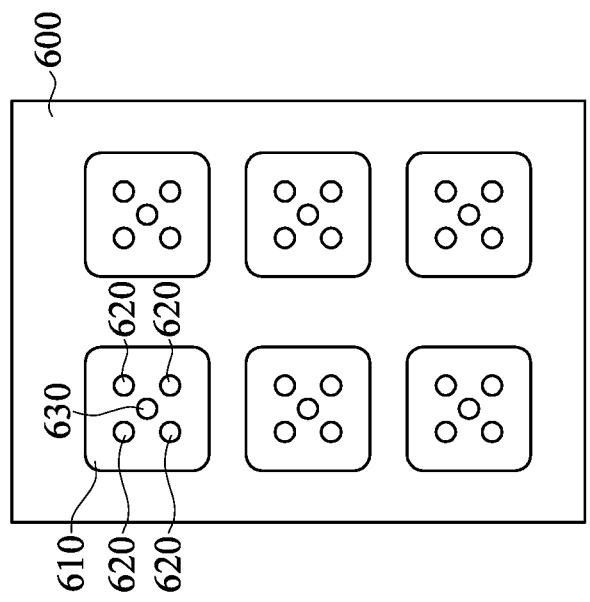
Figure 6C:
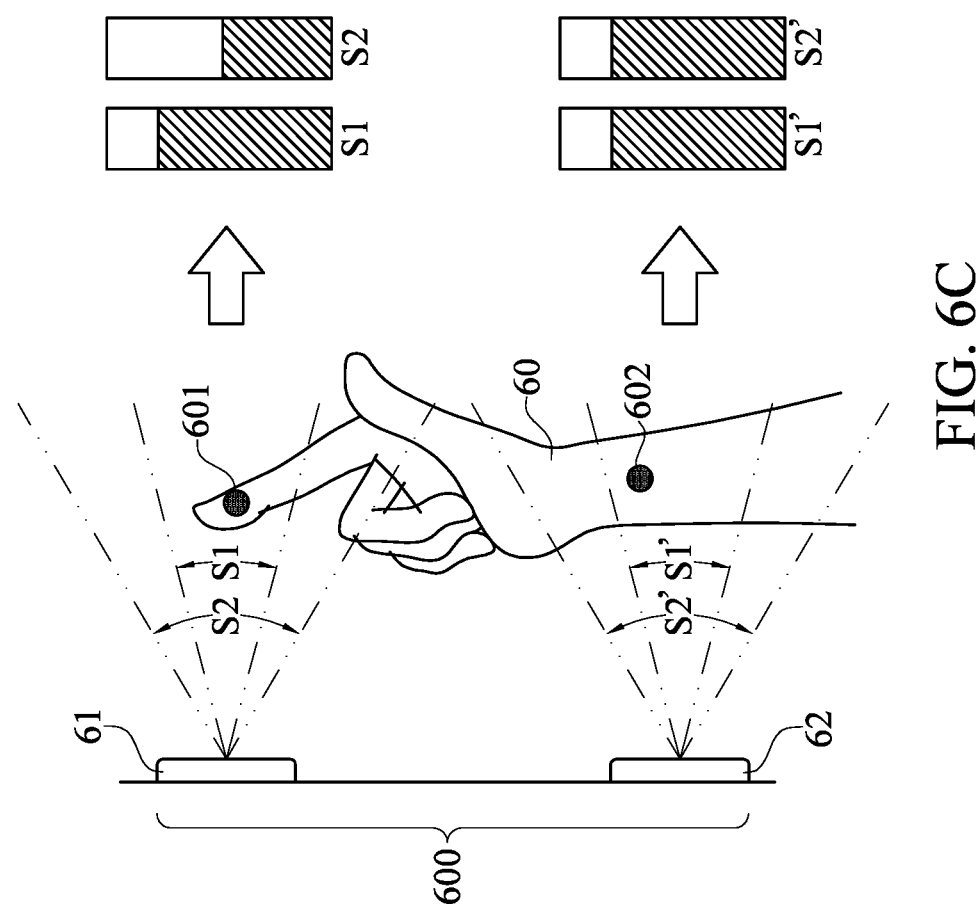

The abovementioned system can also include more than one optical sensing apparatus such as a first optical sensing apparatus 401 and a second optical sensing apparatus 402, which are exemplarily shown in FIGS. 6A-6C. A controller 40 of the system is electrically connected with the first optical sensing apparatus 401 and the second optical sensing apparatus 402, and is able to control these optical sensing apparatuses (401, 402) to sense the lights reflected by the object. After integrating the information of the intensities sensed from the multiple light beams within the different sensing ranges defined by the optical sensing apparatuses (401, 402) respectively, the controller 40 can effectively identify the object. In yet another aspect, the determination made by the controller 40 can be transmitted to an electronic device such as the above-mentioned controlled device; or alternatively the information obtained by the controller 40 can also be transmitted to a host 42 that performs the method for identifying the object.

Figure 5:
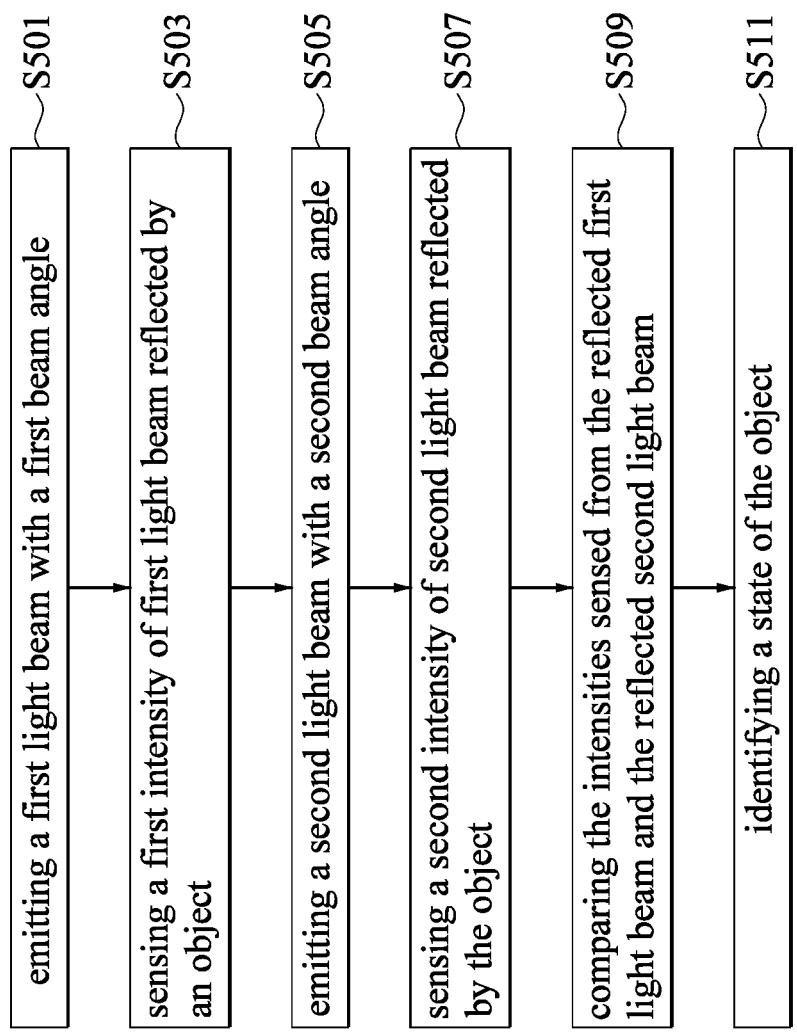
FIG. 5 is a flowchart which describes a method for identifying an object according to one embodiment of the present disclosure.

Reference is made to FIG. 5, which is a flowchart which describes a method for identifying an object according to one embodiment of the present disclosure.

In various embodiments of the present disclosure, the sample flowchart shows steps that are arranged in a sequence to describe a process flow performed in an optical sensing apparatus or a system. In the beginning, as shown in step S501, a controller of the optical sensing apparatus drives a light source, e.g., a first light source, to emit a first light beam with a first beam angle, and in step S503 utilizes a light sensor to sense a first intensity of the first light beam reflected by an object. In the same time or by a time-sharing method, in step S505 the controller drives the light source, e.g., a second light source, to emit a second light beam with a second beam angle, and in step S507 utilizes the light sensor to sense a second intensity of second light beam reflected by the object.

Afterwards, the object can be identified by integrating information of the first intensity and the second intensity. In detail, such as in step S509, the controller compares the intensities sensed from the reflected first light beam and the reflected second light beam respectively, and accordingly, in step S511, identifies a state of the object.

More specifically, in various exemplary examples, the first beam angle of the first light beam is different from the second beam angle of the second light, and a size of the object can be identified by comparing the first intensity and the second intensity. For example, the first beam angle (e.g., S1 of FIG. 3) is configured to be smaller than the second beam angle (e.g., S2 of FIG. 3). Further, a movement of the object can also be identified by comparing a profile of the first intensity and another profile of the second intensity when the intensities are collected within a time period. It should be noted that the profile of the intensities indicates a trend of a series of changes of the intensities sensed for a period of time, and the trend can be used to determine the movement of the object.

FIGS. 6A-6C show schematic diagrams depicting an application of the system with multiple optical sensing apparatuses according to one embodiment of the present disclosure.

The present application is related to a panel system that includes multiple buttons (i.e., the switches) provided for a user to press for performing a subsequent action. For example, the panel system is used in an elevator. The panel system of the elevator provides a panel 600 having multiple buttons 610, as shown in FIG. 6A, which are provided for a passenger to push one of the buttons for requesting a destination floor. A system having one or more optical sensing apparatuses of the present disclosure is installed in the panel system according to the present embodiment of the disclosure.

The panel 600 includes multiple buttons 610. When a passenger reaches out his hand 60 to press one of the buttons 610 of the panel 600 with his finger, there will not only one optical sensing apparatus installed inside one button senses the approaching hand 60 and the fingers. In an aspect, the optical sensing apparatus including at least two light sources and a light sensor installed inside every button allows the panel system to prevent a false action caused by an error judgment in deciding the button to be pressed.

In the optical sensing apparatus, at least two light sources are provided to emit at least two light beams with at least two different beam angles forming different sensing ranges. The at least two light sources accordingly provide more spatial information for the controller of the optical sensing apparatus to identify an approaching object, i.e., the hand 60 and the fingers. The optical sensing apparatus actually can identify a size of the approaching object based on the intensities sensed from the different reflected light beams, and in the present embodiment the optical sensing apparatus can identify the parts of the user's body, palm and fingers.

FIG. 6B shows an exemplary example of the panel 600 having multiple buttons 610, and in which every button is installed with an optical sensing apparatus including a light sensor 630 and multiple light sources 620.

FIG. 6C schematically shows a diagram depicting a circumstance that a hand 60 approaches the panel 600 having two buttons installed with a first optical sensing apparatus 61 and a second optical sensing apparatus 62 respectively. The first optical sensing apparatus 61 emits two light beams for forming two different sensing ranges (S1, S2) and the second optical sensing apparatus 62 also emits two light beams for forming another two different sensing ranges (S1', S2').

In the present exemplary example, when the hand 60 approaches the panel 600 having the two buttons, i.e., the first optical sensing apparatus 61 and the second optical sensing apparatus 62, the first optical sensing apparatus 61 senses a first portion 601 (i.e., the index finger) of the hand 60 and at the same time the second optical sensing apparatus 62 senses a second portion 602 (i.e., the palm) of the hand 60. As discussed above, even if the hand 60 is within a very short distance from the buttons, the controller of the optical sensing apparatus can accurately identify the different portions of the hand 60. Therefore, the optical sensing apparatus of the present disclosure can prevent the false action effectively.

It other words, the size of the approaching object can be identified by the optical sensing apparatus based on the intensities sensed from different sensing ranges (S1, S2 or S1', S2'). The right side of the figure exemplarily shows a relationship between a first intensity obtained within a first sensing range (S1, S1') of the first optical sensing apparatus 61 or the second optical sensing apparatus 62 and a second intensity obtained within a second sensing range (S2, S2'). For example, referring to the right side of the figure that shows the first intensity (S1) of the first optical sensing apparatus 61 is greater than the second intensity (S2), if the first intensity sensed from a first light beam reflected by the object is greater than a second intensity sensed from a reflected second light beam, it is determined that the object is a small size. Specifically, as shown in FIG. 6C, the first optical sensing apparatus 61 can recognize that the first portion 601 is the user's finger because the intensities sensed from the two light beams reflected by the first portion 601 which is a smaller portion within the two different sensing ranges S1 and S2 are different and a difference therebetween exceeds a threshold.

On the other hand, referring to the right side of the figure that shows the first intensity (S1') of the second optical sensing apparatus 62 is similar with the second intensity (S2'), the second optical sensing apparatus 62 may not easily recognize the second portion 602 is the user's palm but may recognize it is not the finger because a difference between the intensities sensed from the two light beams reflected respectively by the second portion 602 which is a larger portion within the two different sensing ranges S1' and S2' does not exceed the threshold.

Therefore, the system including the one or more optical sensing apparatuses allows the panel system mentioned above to prevent the false action caused by the error judgment when the contactless buttons are adopted in the panel system.

Figure 7B:
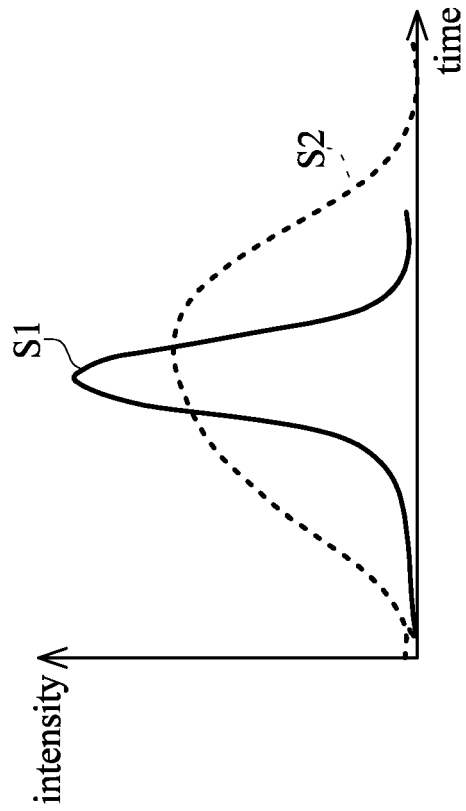
FIG. 7B is a schematic chart showing intensity distribution curves generated by the optical sensing apparatus shown in FIG. 7A.
Figure 7A:
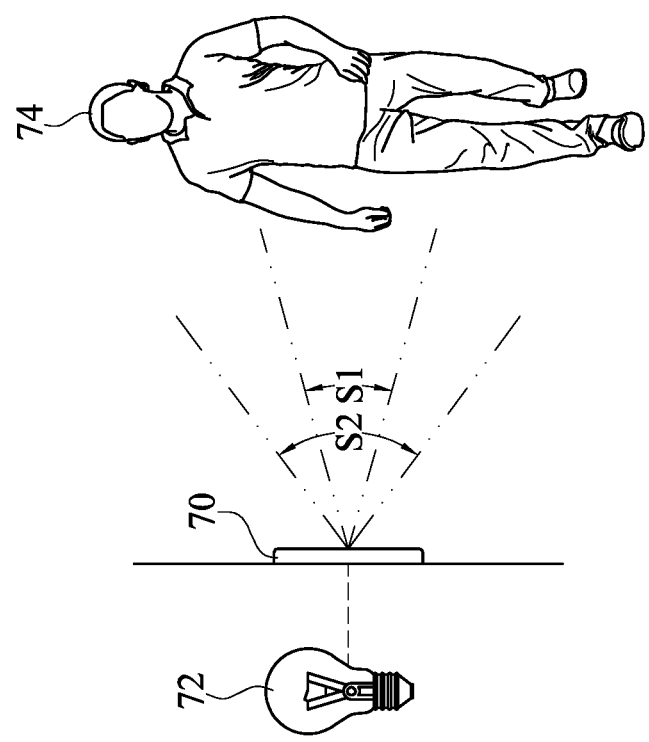
FIG. 7A is a schematic diagram depicting an optical sensing apparatus sensing a moving object in an exemplary example of the disclosure.

Furthermore, in one further aspect, the optical sensing apparatus can also identify a moving object. Reference is made to FIG. 7A, which is a schematic diagram depicting an optical sensing apparatus 70 used to sense a moving object 74 and to instruct a controlled device 72 to perform a subsequent action in an exemplary example of the disclosure.

In the drawing, a switch equipped with an optical sensing apparatus 70 is shown. In the optical sensing apparatus 70, two light sources are driven to emit two light beams for forming two sensing ranges, i.e., a first sensing range S1 and a second sensing range S2, with two different beam angles. The optical sensing apparatus 70 is configured to sense a moving object 74 if the moving object 74 enters a sensing zone defined by the two sensing ranges S1 and S2. As discussed above, the object can be identified based on a difference between the intensities sensed from the two light beams reflected by the object 74 respectively since the first beam angle S1 is configured to be different from the second beam angle S2, for example S1 is smaller than S2.

Furthermore, for identifying the moving object 74, the optical sensing apparatus 70 is configured to sense the intensities from the at least two light beams reflected from the object 74 for a period of time because a trend indicated by the changes of the intensities sensed for the period of time can be referred to for determining a movement of the object 74. In an aspect, a first set of intensities are sensed from the first light beam reflected by the object 74 for a period of time, and a second set of intensities are sensed from the second light beam reflected by the object 74 for the same period of time, and the first set and the second set of intensities over time are resolved to determine a movement of the object 74. For example, when a first trend of the changes of the first set of intensities is close to a second trend of changes of the second set of intensities, it is determined that the object is close to or away from the optical sensing apparatus 70.

The trend indicated by the changes of the intensities for a period of time is referred to for determining the movement of the object 74. The first trend or the second trend of the intensities can be described by distribution curves, as shown in FIG. 7B. The trends are formed by sensing the intensities according to the sensed reflected lights over time. The above-mentioned first trend indicating the changes of the first set of intensities refers to a narrower distribution curve with an obvious peak because the intensities being sensed over time as the object passing by the smaller first sensing range S1 will have dramatic changes. On the other hand, the second trend indicating the changes of the second set of intensities refers to a flatter distribution curve without an obvious peak because the intensities over time do not have dramatic changes when the object passes by the relatively larger second sensing range S2.

Through the above-mentioned scheme, in some embodiments for identifying the moving object, the system can eliminate the event that the object merely passes by the optical sensing apparatus without intention to approach the optical sensing apparatus; and, in other words, the system can effectively sense the event that the object intents to approach the optical sensing apparatus.

Figure 8B:
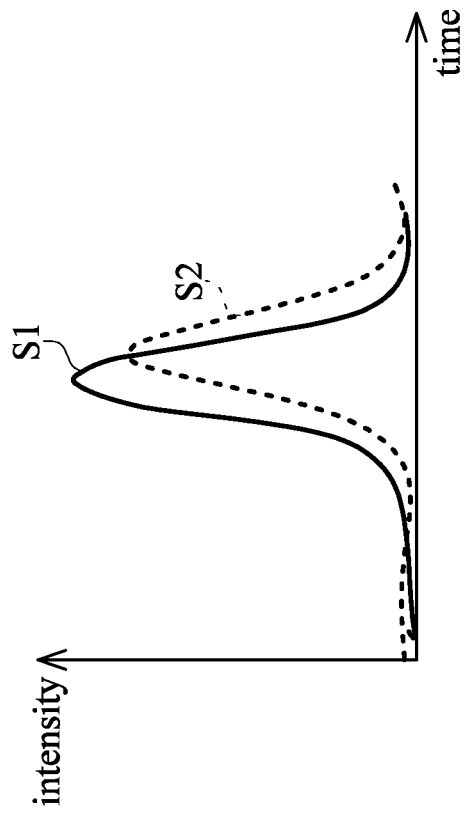
FIG. 8B is another schematic chart showing intensity distribution curves generated by the optical sensing apparatus shown in FIG. 8A.
Figure 8A:
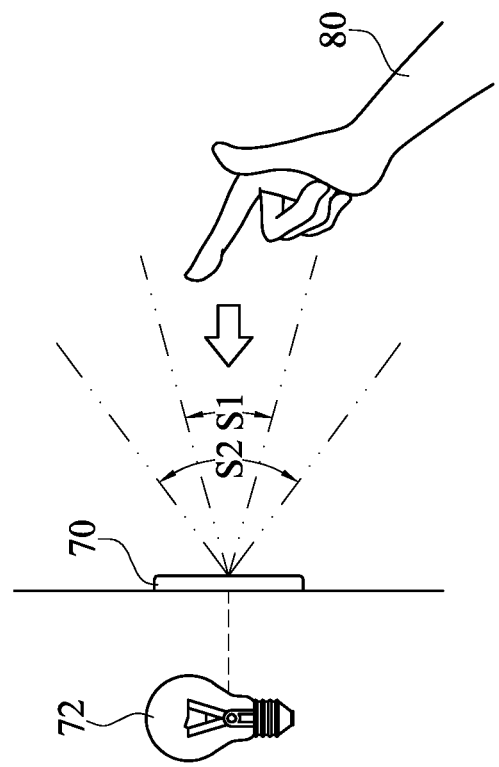
FIG. 8A is another schematic diagram depicting an optical sensing apparatus sensing an approaching object in an exemplary example of the disclosure.

FIG. 8A is another schematic diagram depicting the optical sensing apparatus sensing an approaching object in an exemplary example of the disclosure.

A switch installed with an optical sensing apparatus 70 coupled to a controlled device 72 is shown in the diagram. In the optical sensing apparatus 70, a controller drives two light sources to emit two different light beams, i.e., a first light beam and a second light beam, for forming a first sensing range S1 and a second sensing range S2. By this arrangement, the intensities respectively sensed from the reflected first light beam and the reflected second light are compared for determining a movement of an approaching object 80. In an aspect, if it is determined that the object 80 intents to approach to the optical sensing apparatus 70, the controlled device 72 coupled with the optical sensing apparatus 70 can be activated for performing a specific action.

In the drawing, an object 80, e.g., a user's hand, approaches the switch with the optical sensing apparatus 70. Similarly, the two senor sources are driven to emit two light beams forming two different sensing ranges with two different beam angles. Therefore, the optical sensing apparatus 70 outputs two sets of intensities sensed from the two light beams reflected by the approaching object 80. The two sets of intensities sensed by the optical sensing apparatus 70 for a period of time can be drawn by a first trend that indicates changes of a first set of intensities and a second trend that indicates changes of a second set of intensities. In the present embodiment, the first trend and the second trend can be described by the distribution curves shown in FIG. 8B.

Since the two sets of intensities are sensed from two different light beams reflected by the object 80 which enters a sensing zone defined by different sensing ranges with different beam angles, the intensity distribution curves over time can be used to determine the movement of the object 80.

For example, in FIG. 8B, the first trend with respect to the first set of intensities sensed within the first sensing range S1 refers to the earlier intensity distribution curve with a higher peak and the second trend with respect to the second set of intensities sensed within the second sensing range S2 refers to the later intensity distribution curve with a lower peak. Therefore, the trends respective to the first set of intensities and the second set of intensities can be used to determine the movement of the object 80. In the present aspect, when the first trend of changes of the first set of intensities is close to the second trend of changes of the second set of intensities for the period of time, it is determined that the object is close to or away from the light sensor.

Figure 9A:
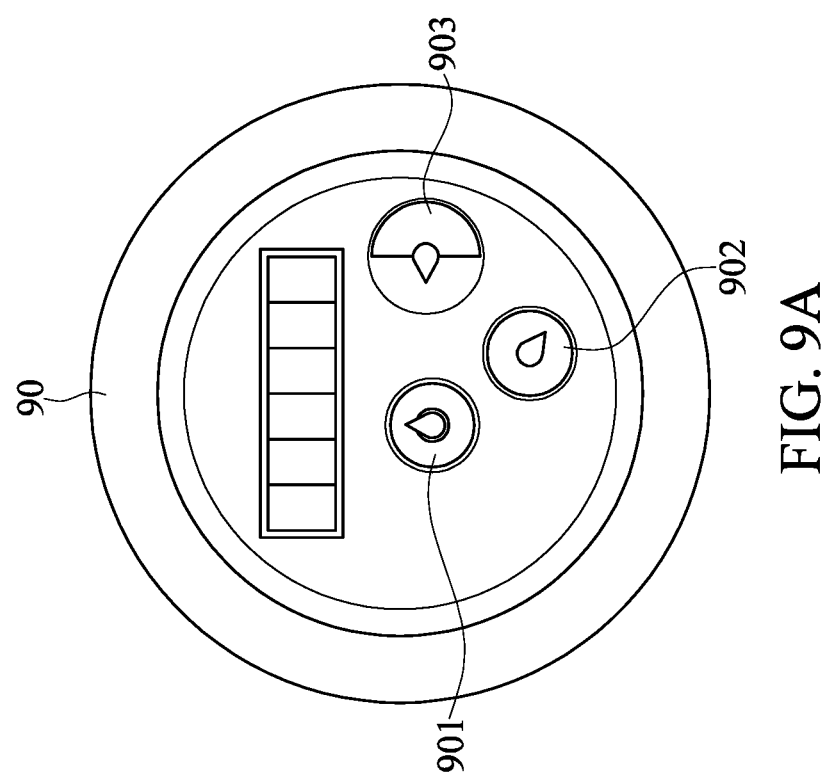
FIGS. 9A-9D show schematic views depicting one more application of the system with multiple optical sensing apparatuses according to one more embodiment of the present disclosure.
Figure 9B:
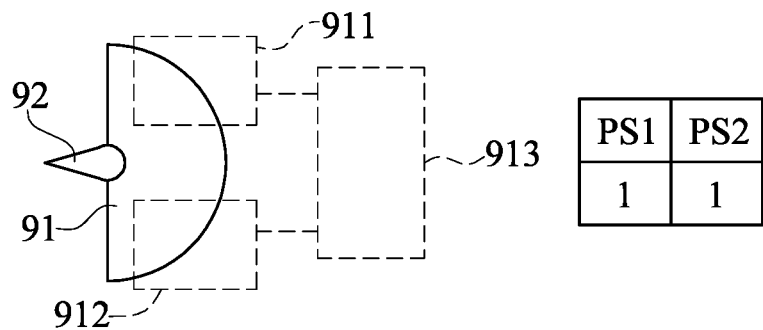
Figure 9C:
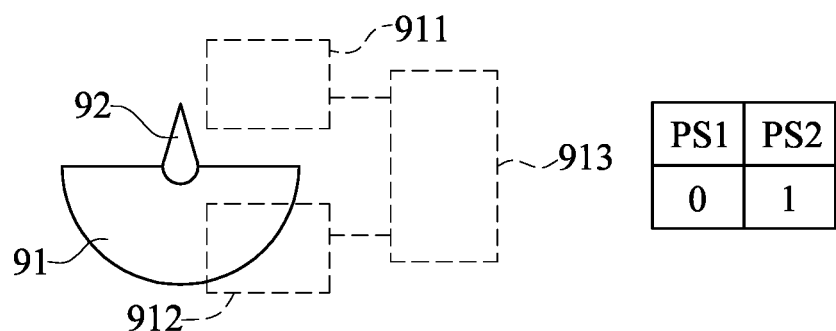
Figure 9D:
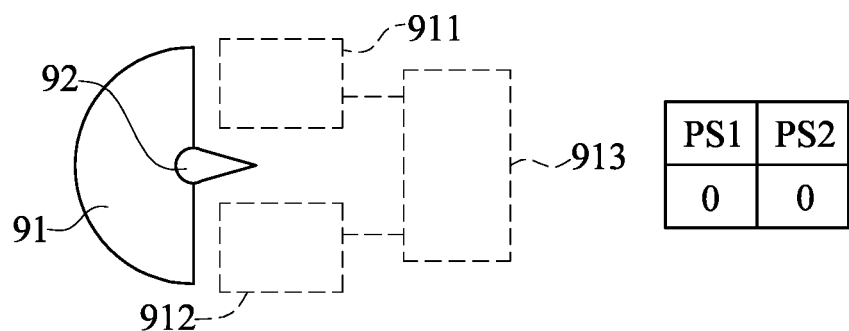

The method and the system for identifying the object using the optical sensing apparatus of the present disclosure can be applied to various applications. FIGS. 9A-9D show schematic views depicting one more application of the system with multiple optical sensing apparatuses according to one more embodiment of the present disclosure. A meter 9 (e.g., a water meter) is shown in FIG. 9A. The meter 9 includes several indicators 901, 902, 903, and each of which includes a rotatable half plate 91 and a rotatable pointer 92, and the rotatable pointer 92 and the rotatable half plate 91 are connected with each other, as shown in FIGS. 9B-9D.

According to one embodiment of the present disclosure, one or more optical sensing apparatuses are installed in the meter 9. The optical sensing apparatus acts as a proximity sensor for determining if the meter 9 is rotated clockwise or counter-clockwise in order to monitor the meter 9. For example, the optical sensing apparatus includes a first proximity sensor 911, a second proximity sensor 912 and a controller 913. The first proximity sensor 911 and the second proximity sensor 912 can be disposed in or on the meter 9 and driven to emit two light beams with two separate beam angles from different positions. The first proximity sensor 911 and the second proximity sensor 912 then sense the light beams reflected by the rotatable pointer 92 or the rotatable half plate 91 respectively.

While the optical sensing apparatus is constantly in operation, the first proximity sensor 911 outputs a first signal when it detects the rotatable half plate 91, and the first proximity sensor 911 outputs a second signal when it does not detect the rotatable half plate 91. Similarly, the second proximity sensor 912 outputs a third signal when it detects the rotatable half plate 91, and the second proximity sensor 912 outputs a fourth signal when it does not detect the rotatable half plate 91. The controller 913, which is electrically connected to the first proximity sensor 911 and the second proximity sensor 912, then receives the signals from the first proximity sensor 911 and the second proximity sensor 912 respectively, and determines the meter 9 is rotated clockwise or counter-clockwise.

FIGS. 9B-9D schematically show at least three conditions of any of the indicators 901, 902 and 903 of the meter 9, and use tables to illustrate three Boolean conditions for indicating the states of the first proximity sensor 911 and the second proximity sensor 912 to the controller 913. It should be noted that these tables are simple examples for illustrating the method of the present disclosure.

According to the present examples, FIG. 9B shows that both the first proximity sensor (PS1) 911 and the second proximity sensor (PS2) 912 detect the rotatable half plate 91 but not the rotatable pointer 92, and a Boolean expression on the side shows states (PS1:1, PS2:1) of the two sensors (911, 912); FIG. 9C shows that the second proximity sensor (PS2) 912 detects the rotatable half plate 91, and the Boolean expression on the side shows states (PS1:0, PS2:1) of the two sensors (911, 912); and FIG. 9D shows that none of the two sensors (911, 912) detects the rotatable half plate 91, and the Boolean expression on the side shows states (PS1:0, PS2:0). Accordingly, the system can determine the movement of the meter 9 based on the continuous states of the two sensors (911, 912) transmitted from the controller 913. For example, the system can rely on a Boolean expression, as shown in Table 1, that indicates various states of the two sensors to determine the movement, i.e., rotated clockwise or counter-clockwise, of the meter 9 over time.

TABLE 1

|  | Clockwise | | Counter-Clockwise | |
| --- | --- | --- | --- | --- |
| Time | PS1 | PS2 | PS1 | PS2 |
| 1 | 1 | 1 | 1 | 1 |
| 2 | 0 | 1 | 1 | 0 |
| 3 | 0 | 0 | 0 | 0 |
| 4 | 1 | 0 | 0 | 1 |
| 5 | 1 | 1 | 1 | 1 |

It should be noted that, as applying the above embodiments of the method for identifying the object of the present disclosure, the optical sensing apparatus installed in the meter 9 can effectively avoid wrong interpretation of the rotating direction of the rotatable half plate 91 or the rotatable pointer 92 because the optical sensing apparatus uses the trends of intensities sensed from at least two light beams to identify the movement of the rotatable half plate 91 or the rotatable pointer 92.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for identifying an object, comprising:
   using a first light source to emit a first light beam with a first beam angle;
   using a light sensor to sense a first intensity of the first light beam reflected by the object;
   using a second light source to emit a second light beam with a second beam angle;
   using the light sensor to sense a second intensity of the second light beam reflected by the object; and
   identifying the object by integrating information of the first intensity and the second intensity,
   wherein the first beam angle of the first light beam is configured to be smaller than the second beam angle of the second light beam, and the object is identified when the object enters both the first beam angle and the second beam angle.

2. The method according to claim 1, wherein the first beam angle of the first light beam is different from the second beam angle of the second light beam, and a size of the object is identified by comparing the first intensity and the second intensity.

3. The method according to claim 1, wherein the first beam angle of the first light beam is different from the second beam angle of the second light beam; and
   a movement of the object is identified by comparing a profile of the first intensity and another profile of the second intensity within a time period.

4. The method according to claim 1, wherein, when the first intensity is greater than the second intensity, it is determined that the object is a small size.

5. The method according to claim 1, wherein, a first set of intensities are sensed for a period of time and a second set of intensities are sensed for the same period of time, and the first set and the second set of intensities over time are resolved to determine a movement of the object.

6. The method according to claim 5, wherein, when a first trend of changes of the first set of intensities is close to a second trend of changes of the second set of intensities for the period of time, it is determined that the object is close to or away from the light sensor.

7. The method according to claim 6, wherein the first trend or the second trend is described by a distribution curve that is formed by sensing the intensities according to the sensed reflected lights over time.

8. An optical sensing apparatus, comprising:
   multiple light sources used to emit multiple light beams with different beam angles;
   a light sensor used to sense the lights reflected by an object when the multiple light beams illuminate the object; and
   a controller, electrically connected to the multiple light sources and the light sensor, wherein the controller drives the multiple light sources to emit the multiple light beams, controls the light sensor to sense the lights reflected by the object, and performs a method for identifying the object comprising:
   using a first light source to emit a first light beam with a first beam angle;
   using the light sensor to sense a first intensity of the first light beam reflected by the object;
   using a second light source to emit a second light beam with a second beam angle;
   using the light sensor to sense a second intensity of the second light beam reflected by the object; and
   identifying the object by integrating information of the first intensity and the second intensity,
   wherein the first beam angle of the first light beam is configured to be smaller than the second beam angle of the second light beam, and the object is identified when the object enters both the first beam angle and the second beam angle.

9. The optical sensing apparatus according to claim 8, wherein intensities respectively sensed from the reflected first light beam and the reflected second light beam are compared in order to determine a movement of the object.

10. A system, comprising:
    one or more optical sensing apparatuses, in which the optical sensing apparatus includes multiple light sources used to emit multiple light beams with different beam angles and a light sensor used to sense the lights reflected by an object when the multiple light beams illuminate the object;
    a controller, electrically connected to the one or more optical sensing apparatuses, wherein the controller drives the multiple light sources to emit the multiple light beams, controls the light sensor to sense the lights reflected by the object, and performs a method for identifying the object comprising:
    using a first light source to emit a first light beam with a first beam angle;
    using the light sensor to sense a first intensity of the first light beam reflected by the object;
    using a second light source to emit a second light beam with a second beam angle;
    using the light sensor to sense a second intensity of the second light beam reflected by the object; and
    identifying the object by integrating information of the first intensity and the second intensity,
    wherein the first beam angle of the first light beam is configured to be smaller than the second beam angle of the second light beam, and the object is identified when the object enters both the first beam angle and the second beam angle.

11. The system according to claim 10, wherein, when the first intensity sensed from the reflected first light beam is greater than the second intensity sensed from the reflected second light and a difference between the intensities exceeds a threshold, it is determined that the object is close to the light sensor.

12. The system according to claim 10, wherein, a first set of intensities are sensed when sensing the first light beam for a period of time and a second set of intensities are sensed when sensing the second light for the same period of time, and the first set and the second set of intensities over time are resolved to determine a movement of the object.

13. The system according to claim 12, wherein, when a first trend of changes of the first set of intensities is close to a second trend of changes of the second set of intensities for the period of time, it is determined that the object is close to or away from the light sensor.

\* \* \* \* \*